US012631415B2

(12) United States Patent
Lessard

(10) Patent No.: US 12,631,415 B2
(45) Date of Patent: May 19, 2026

(54) 3D-PRINTED SUPPORT STRUCTURES FOR SOUND SUPPRESSORS

(71) Applicant: Q, LLC, Dover, NH (US)

(72) Inventor: Ethan Michel Lessard, Dover, NH (US)

(73) Assignee: Q,LLC, Dover, NH (US)

( * ) Notice: Subject to any disclaimer, the term of this patent is extended or adjusted under 35 U.S.C. 154(b) by 10 days.

(21) Appl. No.: 18/660,329

(22) Filed: May 10, 2024

(65) Prior Publication Data

US 2024/0377153 A1 Nov. 14, 2024

Related U.S. Application Data

(60) Provisional application No. 63/501,631, filed on May 11, 2023.

(51) Int. Cl.
*F41A 21/30* (2006.01)
*B33Y 80/00* (2015.01)

(52) U.S. Cl.
CPC .............. *F41A 21/30* (2013.01); *B33Y 80/00* (2014.12)

(58) Field of Classification Search
CPC .......... F41A 21/30; F41A 21/32; F41A 21/36; F41A 21/38; F41A 21/40; B33Y 80/00
See application file for complete search history.

(56) References Cited

U.S. PATENT DOCUMENTS

| | | | | |
|---|---|---|---|---|
| 4,576,083 | A * | 3/1986 | Seberger, Jr. ............. | F01N 1/08 |
| | | | | 89/14.4 |
| 5,357,842 | A * | 10/1994 | Reynolds ................ | F41A 21/36 |
| | | | | 89/14.3 |
| 8,424,635 | B1 * | 4/2013 | Klawunn ................ | F41A 21/34 |
| | | | | 181/227 |
| 9,310,152 | B1 * | 4/2016 | Poling ..................... | F41A 21/36 |
| 11,255,623 | B2 * | 2/2022 | Kras ........................ | F41A 21/30 |
| 11,686,547 | B2 * | 6/2023 | Kras ........................ | F41A 21/30 |
| | | | | 89/14.4 |
| 2013/0227871 | A1 * | 9/2013 | Stone ...................... | F41A 21/30 |
| | | | | 42/76.1 |
| 2018/0202744 | A1 * | 7/2018 | De Sousa ............... | F41A 21/30 |
| 2018/0252489 | A1 * | 9/2018 | Parker ..................... | F41A 21/30 |
| 2018/0292160 | A1 * | 10/2018 | Petersen ................ | F41A 21/44 |

(Continued)

*Primary Examiner* — Benjamin P Lee
(74) *Attorney, Agent, or Firm* — Eversheds Suther land (US) LLP

(57) ABSTRACT

Sound suppressors are provided. The sound suppressor includes an engagement, attachable to a barrel of a firearm, and one or more baffle structures manufactured by 3D printing and forming a baffle stack. Each baffle structure includes one or more baffles housed within a wall. The baffles are connected to one another and to the wall by one or more supports, which provide for improved structural strength. The supports further define channels between the baffles and the wall, decreasing weight without sacrificing structural strength. The channels are open or sealed to facilitate flow of pressurized gas between chambers defined by the baffles and the wall, the pressurized gas being generated during discharge of the firearm. The pressurized gas decompresses and cools while traveling between the chambers and the channels, thereafter exiting the sound suppressor at a decreased pressure, temperature, and veloc-ity, which may attenuate a noise associated with the dis-charge.

20 Claims, 11 Drawing Sheets

(56)　　　　　　　References Cited

U.S. PATENT DOCUMENTS

| | | | | |
|---|---|---|---|---|
| 2020/0284541 | A1* | 9/2020 | Poling | F41A 21/30 |
| 2021/0041200 | A1* | 2/2021 | Kras | F41A 21/30 |
| 2021/0180902 | A1* | 6/2021 | Bray | F41A 21/30 |
| 2021/0190449 | A1* | 6/2021 | Travis | F41A 21/28 |
| 2021/0190451 | A1* | 6/2021 | Miller | F41A 21/34 |
| 2021/0254921 | A1* | 8/2021 | Spector | F41A 21/34 |
| 2021/0333061 | A1* | 10/2021 | Muceus | F41A 21/30 |
| 2022/0049920 | A1* | 2/2022 | Kras | F41A 21/30 |
| 2022/0276016 | A1* | 9/2022 | Dueck | F41A 21/34 |
| 2023/0417507 | A1* | 12/2023 | Kras | F41A 21/34 |
| 2024/0035771 | A1* | 2/2024 | Spector | F41A 21/30 |
| 2024/0271898 | A1* | 8/2024 | Reis-Green | F41A 21/30 |
| 2024/0288240 | A1* | 8/2024 | Puha | F41A 21/325 |
| 2024/0288242 | A1* | 8/2024 | Kras | F41A 21/30 |
| 2024/0410668 | A1* | 12/2024 | Miller | F41A 21/30 |
| 2025/0044049 | A1* | 2/2025 | Jensen | F41A 21/30 |
| 2025/0130005 | A1* | 4/2025 | Knott | F41A 21/30 |

* cited by examiner

400

402

Provide model(s) to
three-dimensional (3D) printing system

404

Form baffle structure(s) with support(s)
using 3D printing system

406

Evacuate additive from baffle structure(s)

408

Form baffle stack with baffle structure(s)

410

Provide engagement

412

Mate baffle stack with engagement

3D-PRINTED SUPPORT STRUCTURES FOR SOUND SUPPRESSORS

CROSS-REFERENCE TO RELATED APPLICATIONS

The present application claims the benefit of and priority to U.S. Provisional Application No. 63/501,631, filed on May 11, 2023, the disclosure of which is incorporated by reference herein in its entirety.

TECHNICAL FIELD

The present application generally relates to sound suppressors for firearms.

BACKGROUND

When a firearm is discharged, a projectile from a cartridge or round of ammunition chambered in the firearm is propelled through a barrel of the firearm by a volume of pressurized gas. This volume of gas, initially generated by combustion of a propellant loaded within the cartridge and ignited during discharge, follows the projectile along its trajectory, expanding and eventually cooling during travel. If the firearm is unsuppressed at the time of discharge, the volume of gas exits the barrel at an exceedingly high pressure, a similarly high temperature, and (often) supersonic velocity. As the exiting volume of gas rapidly decompresses and cools upon entering an external environment, an uncomfortably loud "crack" akin to a miniature sonic boom may be generated. This noise may be associated with permanent damage to the hearing of those near the firearm at the time of discharge.

A sound suppressor may attenuate the noise generated during discharge of the firearm by providing for the volume of gas to depressurize and cool before exiting into the external environment. A typical sound suppressor is attached to the barrel of a firearm and often includes a number of baffles defining chambers for the volume of gas to travel about, thereby depressurizing and cooling to a certain extent, before exiting via an aperture opposite the end of the sound suppressor at which the barrel is attached.

However, the typical sound suppressor can be bulky and unwieldy, regularly utilizing baffles with unsophisticated designs that provide only a modicum of pressure and temperature relief before allowing the volume of gas to exit into the external environment at an undesirable pressure, temperature, and velocity. At the same time, existing designs for sound suppressors fail to adequately take advantage of emerging manufacturing processes and techniques that might offer opportunities for improvement in design and performance.

Three-dimensional (3D) printing is one such manufacturing process. However, sound suppressors currently on the market that were formed, in whole or in part, by 3D printing fail to capture the benefits of this manufacturing process in their designs or otherwise exhibit limitations of their own due to the unique challenges of 3D printing. For example, existing 3D-printed sound suppressors simply add greater amounts of material to their baffles or use costly materials capable of tolerating higher temperatures (e.g., materials high in nickel or cobalt) to ensure adequate structural strength during operation. Moreover, material selection aside, a quantity of additive associated with 3D printing typically remains after components are formed and can be challenging or altogether impossible to remove from enclosed or obstructed volumes of those components. As such, existing sound suppressors formed by 3D printing remain burdensome and expensive, and they often have basic and substantially uniform designs that more or less mirror those of other sound suppressors manufactured by more traditional machining.

Accordingly, there is a need for improved sound suppressors that may be formed by 3D printing and offer preferable characteristics associated with depressurization, heat dissipation, structural strength, and weight in a more cost-effective manner.

DETAILED DESCRIPTION

Figure 1:
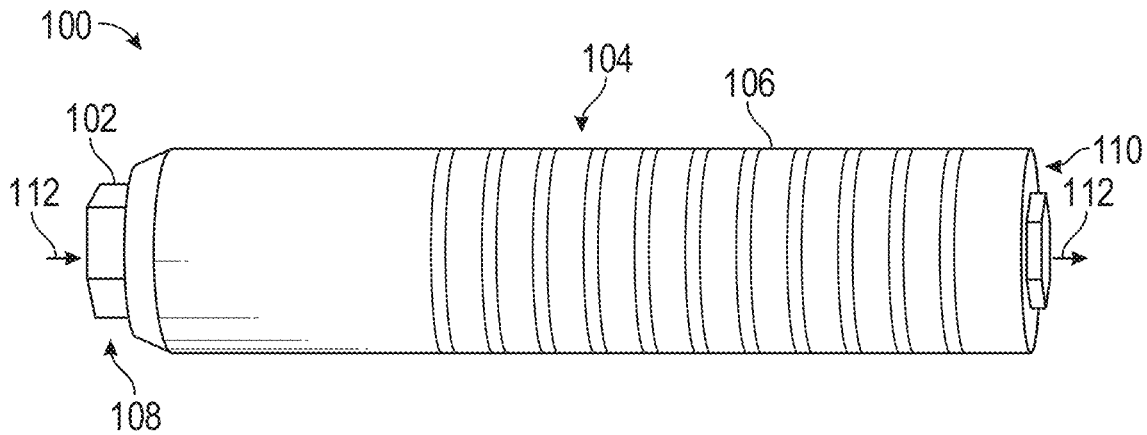
FIG. 1 is a side view of a sound suppressor in accordance with one or more example embodiments of the disclosure.

The present disclosure provides for a sound suppressor. The sound suppressor may include an engagement, attachable to a barrel of a firearm, and one or more baffle structures forming a baffle stack, the baffle stack being attached to the engagement at an end opposite that designed to receive the barrel of the firearm. Each baffle structure may include one or more baffles housed within a wall of the sound suppressor. Each baffle may have a skirt and/or a cone and may define a profile extending from a major diameter to a minor diameter, the minor diameter being smaller than the major diameter.

The baffles may be connected to one another and/or to the wall by one or more supports, which may provide for improved structural strength and rigidity of the sound suppressor. The supports may further define channels between the baffles and/or the wall, which may provide for decreased weight of the sound suppressor without sacrificing the aforementioned structural strength. The channels may further be open or sealed to facilitate a preferred flow of pressurized gas between chambers defined by the baffles and the wall, the pressurized gas being generated during discharge of the firearm and entering the sound suppressor from the barrel of the firearm. The pressurized gas may decompress and cool while traveling between the chambers and/or the channels, thereafter exiting the sound suppressor at a decreased pressure, temperature, and velocity. The baffle structures and/or the wall may include one or more selectively located holes to optimize the preferred flow of pressurized gas so as to further bolster its depressurization and cooling. Further still, the design of the baffle stack and its components may improve thermal transfer characteristics between the sound suppressor and an external environment, providing for more rapid cooling of the pressurized gas within the sound suppressor.

Because a level of noise generated during the discharge of the firearm may be proportional to the pressure, temperature, and velocity of the pressurized gas upon exiting to the external environment, providing for depressurization, cooling, and/or slowing of the pressurized gas within the sound suppressor may effectively attenuate the level of the noise. Accordingly, the sound suppressor described herein may offer improved sound suppression versus existing sound suppressors while simultaneously boasting improved structural strength and weight characteristics.

In order to provide for the various structural features of the baffles and the supports, the baffle structures may be formed by three-dimensional (3D) printing. The baffle stack may be a unitary body including the baffle structures or may be formed by attaching separate baffle structures to each other in a preferred configuration. The design of the baffle stack may facilitate evacuation of any additive associated with the 3D printing and remaining within the chambers and/or the channels of the supports. The baffle stack may be rigidly attached to the engagement, such as by welding.

Referring now to FIG. 1, an example sound suppressor in accordance with one or more embodiments of the present disclosure is illustrated. As shown in FIG. 1, and in brief overview, sound suppressor 100 may include engagement 102 attached to baffle stack 104. The baffle stack 104 may be housed within wall 106 of the sound suppressor 100 and may be formed from one or more baffle structures, such as those illustrated in FIGS. 2A-2D and 3A-3F and further described below. The engagement 102 may be located at proximal end 108 of the sound suppressor 100 (i.e., the end closest to the barrel of the firearm). The baffle stack 104 may be attached to the engagement 102 and extend toward distal end 110 of the sound suppressor 100. Firing axis 112 may be defined by a transverse axis extending through the engagement 102 and the baffle stack 104 and corresponding to a longitudinal axis of the barrel of the firearm.

When the sound suppressor 100 is attached to the barrel of the firearm and the firearm is subsequently discharged, a projectile may be propelled through the barrel and the sound suppressor along the firing axis 112 by a volume of pressurized gas. The design of the baffle stack 104 may provide for the volume of pressurized gas to decompress and cool within the baffle stack 104 (as further described below) before exiting at the distal end 110 of the sound suppressor 100. Accordingly, the sound suppressor 100 may attenuate a noise otherwise associated with the exit of the pressurized gas.

The sound suppressor 100 and its various components may be formed from any suitable materials and by any suitable manufacturing processes. For example, the engagement 102 may be machined from a metal or a metal alloy, while the baffle stack 104 may be formed from a metal, a metal alloy (e.g., aluminum, stainless steel, or titanium), a polymer, or a plastic, either alone or in combination with an additive, by 3D printing. Moreover, the engagement 102, the baffle stack 104, and/or any other component of the sound suppressor 100 may be protectively finished by any suitable process, including but not limited to anodizing, heat treating, nitride finishing, or physical vapor deposition (PVD) coating. It will, of course, be understood by those having skill in the art that these enumerated materials and manufacturing processes are provided for illustrative purposes only and that numerous other materials and manufacturing processes are envisioned by the present disclosure.

The sound suppressor 100 may be designed for use with any firearm. For example, the firearm may be a handgun or a long gun, or any other suitable firearm. Further, the firearm may be chambered for use with any caliber of ammunition. For example, the firearm may be chambered in 8.6 millimeter Blackout, 6.5 millimeter Creedmoor, 7.62 millimeter NATO, .300 Blackout, .300 Winchester Magnum, 9 millimeter, .22 Long Rifle, or any other suitable caliber of ammunition. Moreover, the sound suppressor 100 may either be designed for use with a specific type of firearm chambered in a particular caliber or may be adaptable for use with multiple firearms of different types and/or chambered in different calibers, such as by attaching an adapter (not shown) to the engagement 102. Further still, the sound suppressor 100 may be permanently affixed or integral to the firearm or may be removably attachable to the firearm at the engagement 102 (e.g., by a threaded connection corresponding to a threaded portion of the barrel of the firearm). Accordingly, the sound suppressor 100 may be broadly compatible with numerous firearms and calibers of ammunition depending on various design features described herein.

Referring now to FIGS. 2A-2D, an example baffle structure in accordance with one or more embodiments of the present disclosure is illustrated. As shown throughout FIGS. 2A-2D, and in brief overview, baffle structure 200 may include baffle 202, a structural component such as wall 204, and one or more supports 206 extending from the baffle 202 to the structural component. It should be appreciated that baffle structure 200 may be a component of the sound suppressor 100 of FIG. 1 (e.g., forming at least part of baffle stack 104) and may be the same as or similar to baffle structure 300 of FIGS. 3A-3F, the baffle structures of FIG. 4, or the various baffle structures described in any of FIGS. 1, 3A-3F, or 4, or may be a different baffle structure. In a similar manner, various components and features associated with baffle structure 200 may be the same as or similar to various components and features associated with any of the baffle structures described or envisioned herein, or may be different components.

Figure 2A:
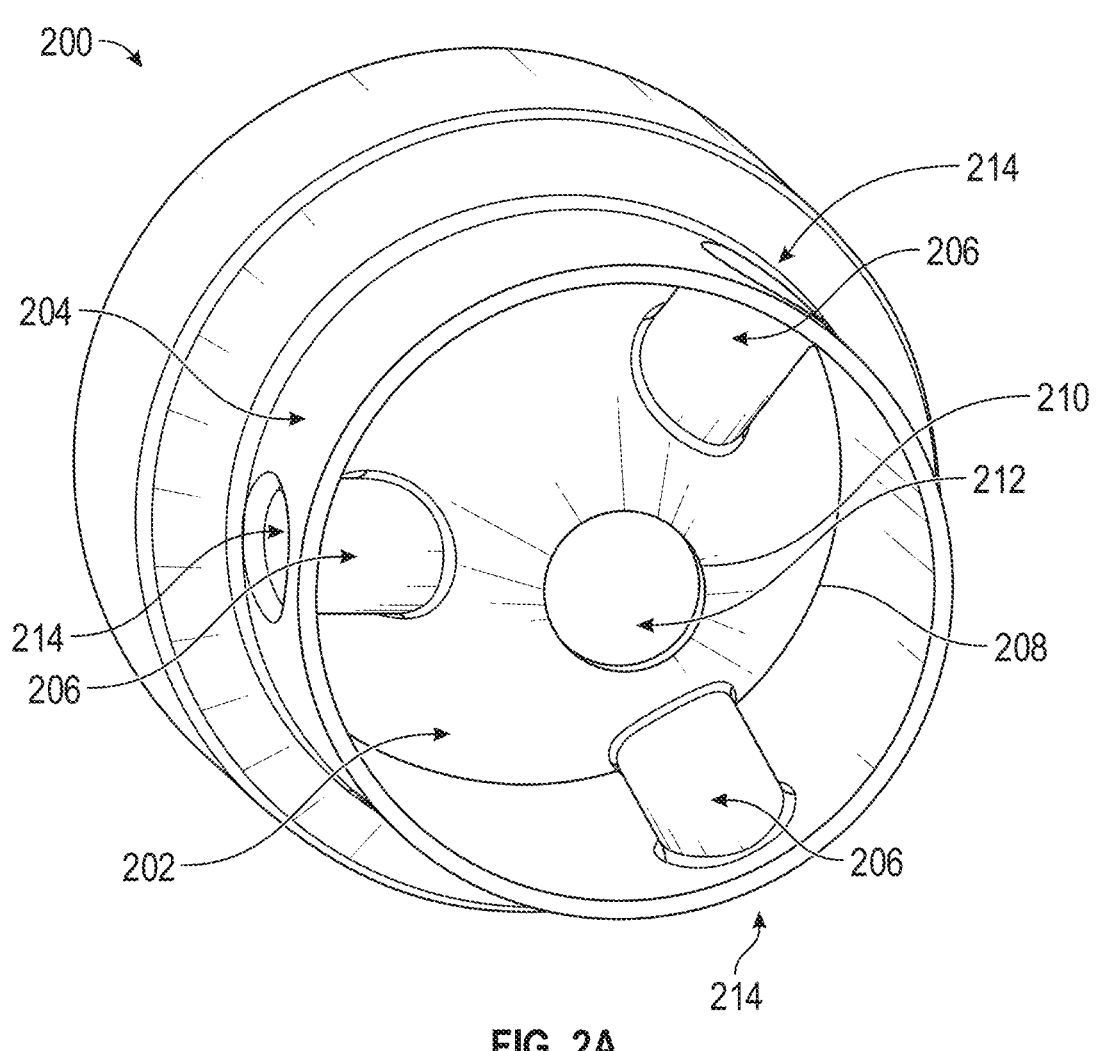
FIGS. 2A-2D are, respectively, a perspective view, a first side view, a second side view, and a cross-sectional view of a baffle structure in accordance with one or more example embodiments of the disclosure.

As shown in FIG. 2A, the baffle 202 may define a profile extending from major diameter 208 to minor diameter 210. The minor diameter 210 may be smaller than the major diameter 208 such that the baffle 202 defines a tapered profile. The baffle 202 may further define aperture 212 about a transverse axis of the minor diameter 210, which may be designed such that a projectile from a firearm cartridge may travel along the transverse axis without contacting the baffle 202.

In the present embodiment, the structural component is wall 204, which may form at least part of a wall of a sound suppressor (e.g., wall 106 of sound suppressor 100, illustrated in FIG. 1). However, in other embodiments, the structural component may be another baffle. For example, the support(s) 206 may extend from the baffle 202 to another baffle where the baffle structure 200 is designed to be installed within a separate housing (not shown) or where the baffle structure 200 includes another structural component connected to the baffle 202 or another baffle by one or more additional supports (as further described, for instance, with respect to the embodiment illustrated in FIGS. 3A-3F).

The support(s) 206 connecting the baffle 202 to the wall 204 may provide the baffle structure 200 with numerous advantages over existing baffle structures. For one, each support 206 may define channel 214 between the baffle 202 and the wall 204, which may provide for improved heat transfer between an internal volume of the baffle structure 200 and an external environment. Given the hollow nature of the channel 214, inclusion of the channel 214 within each support 206 may decrease an amount of material otherwise included within the support(s) 206, thereby requiring a lesser overall weight of the baffle structure 200 versus a different baffle structure having similar external dimensions. At the same time, the design and location of the support(s) 206 may provide structural strength and rigidity to the baffle structure 200 that exceeds any existing designs of comparable size or weight. This improved structural strength may allow for substantial thinning of the baffle 202 and the wall 204, which may provide still further weight reduction with respect to the baffle structure 200. In other words, by connecting the baffle 202 to the wall 204 via the support(s) 206, the baffle structure 200 may exhibit substantially improved structural strength at a decreased weight as compared to a different baffle structure, particularly where each support 206 includes the channel 214.

As will be understood by those having skill in the art, inclusion of the support(s) 206 within the baffle structure 200 as described herein may further offer substantial cost savings in manufacturing the baffle structure 200. For example, simply requiring less of a particular material in forming the baffle structure 200 will reduce costs. Yet another improvement is that the design of the baffle structure 200 may facilitate the use of less costly materials because the chosen materials need not withstand such high temperatures due to the preferable heat transfer characteristics provided by the channel 214. In this manner, the baffle structure 200 may be formed from less expensive and more readily available materials than those required for existing baffle structures with inferior heat transfer characteristics.

Figure 2B:
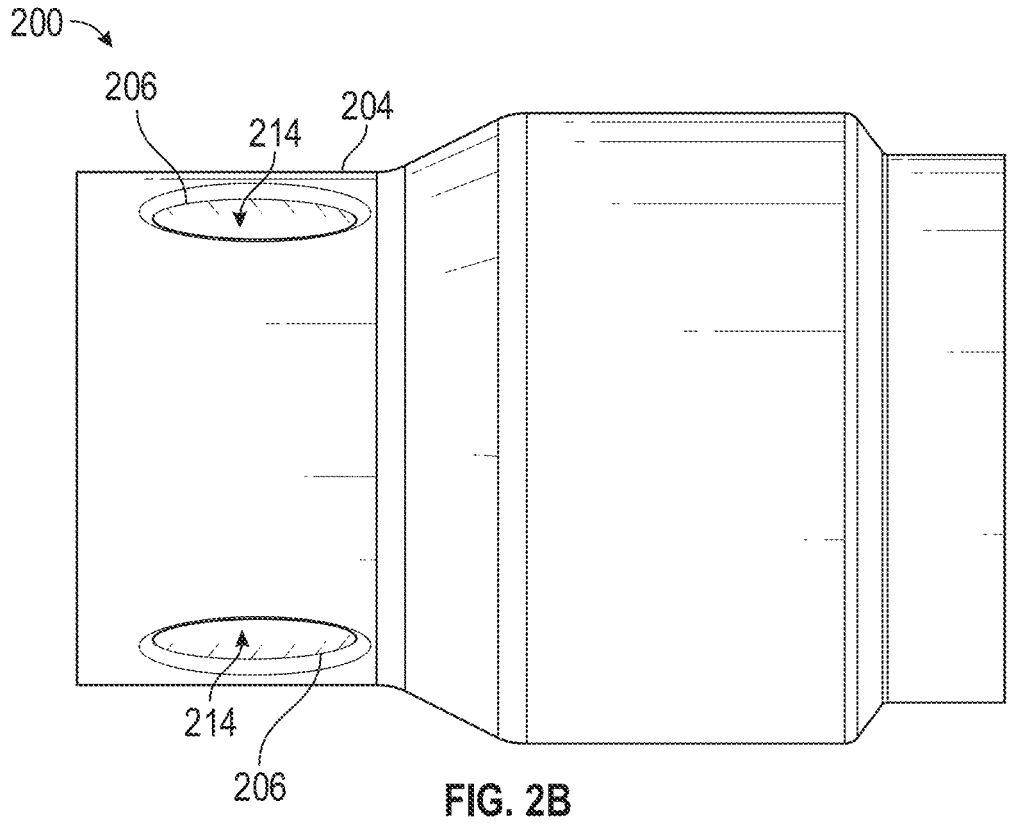
Figure 2C:
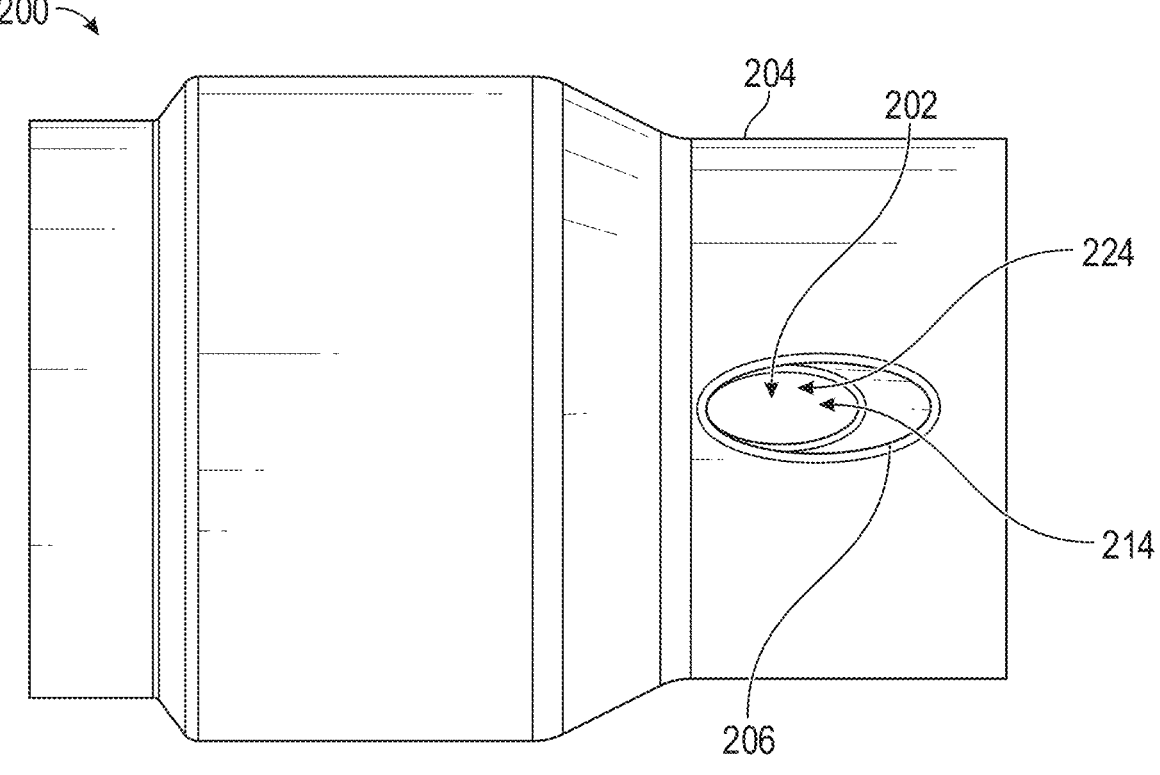

As shown in FIGS. 2B-2C, the baffle structure 200 may include any number of support(s) 206. For example, the support(s) 206 may be concentrically located about the wall 204. Alternatively, the support(s) 206 may be arranged in any other orientation that exhibits preferable structural characteristics and heat transfer for a given assembly or operative environment. Each support 206 may define its own channel 214, or one or more support(s) 206 may lack the channel 214, being substantially solid. Depending on location and preferred functionality, the channel 214 may be scaled at one or both ends or may be open at both ends. For example, it may be preferable to seal the channel 214 at one end where the channel 214 extends to an external environment so as to retain pressurized gas within the baffle structure 200. As shown, for example, in FIG. 2C, the channel 214 may be sealed at one end by a portion of baffle 202 where each support 206 extends from the baffle 202, thereby defining cavity 224. Although not shown in FIG. 2C, the channel 214 might be scaled at an opposing end by a portion of wall 204, thereby defining the cavity 224 from an opposite direction with respect to the channel 214. Alternatively, the channel 214 might be left open at both ends if effectively separated from an external environment, such as by an external sleeve or wall surrounding the baffle structure 200, to better facilitate a flow of the pressurized gas within the baffle structure 200.

Figure 2D:
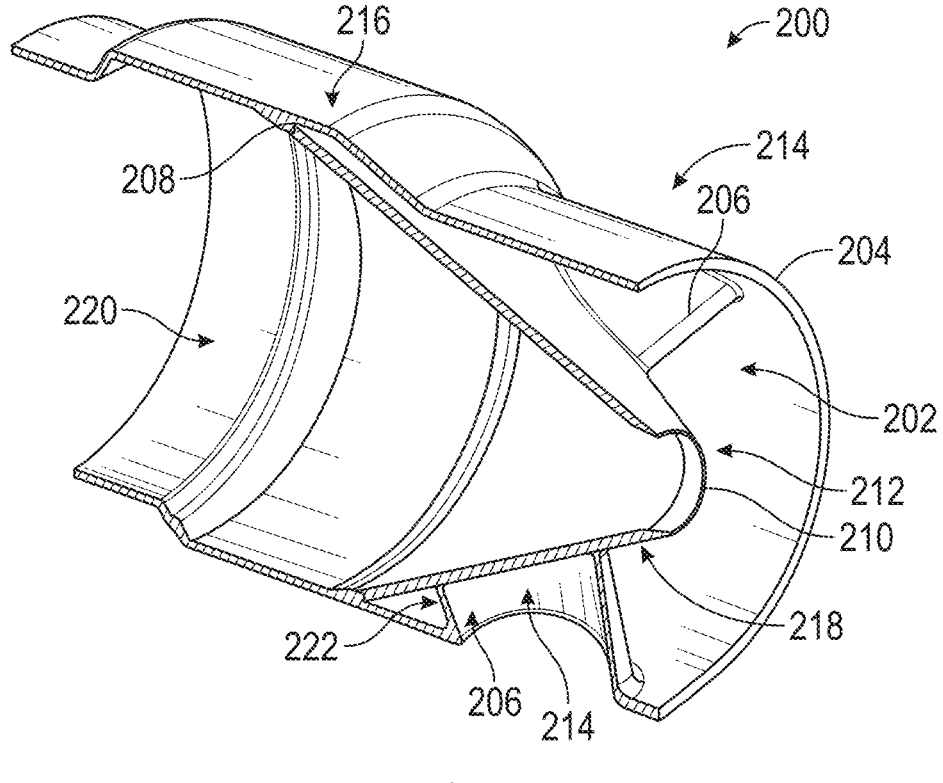

As shown in FIG. 2D, the baffle structure 200 may have various structural features that facilitate a preferred flow of gas (e.g., the pressurized gas generated during discharge of a firearm) within and about the baffle structure 200. These structural features may be variously associated with the baffle 202, the wall 204, and/or the support(s) 206.

For example, the baffle 202 may be formed from skirt 216 connected to cone 218, which may further define the profile of the baffle 202 extending from the major diameter 208 to the minor diameter 210. The skirt 116 and the cone 218 may, in addition to exhibiting their own unique structural characteristics, facilitate the flow of gas in a preferred, potentially nonlinear, manner. The cone 218 may define the aperture 212 about the transverse axis of the minor diameter 210. The skirt 216 and the cone 218 may affect the flow of gas about their respective internal and external surfaces.

The baffle 202 and the wall 204 may define one or more chambers within the baffle structure 200, which may be accessible from various points within or about the baffle structure 200. For example, the baffle 202 may define inner chamber 220, which may receive pressurized gas generated during discharge of a firearm while remaining separated from an external environment except via the aperture 212 (or, in some assemblies, an opposing end of the baffle structure). Outer chamber 222 may be defined by a hollow volume between the baffle 202 and the wall 204 and may be largely separated from the inner chamber 220 by the baffle. Accordingly, the flow of gas from the inner chamber 220 to the outer chamber 222 may be restricted except, for example, at the ends of the baffle structure 200. As another example, the flow of gas between the inner chamber 220 and the outer chamber 222 may be facilitated by locating one or more holes (not shown in FIG. 2D) about the baffle 202.

As pressurized gas travels about the inner chamber 220 and the outer chamber 222, the gas may expand and thereby decrease in pressure. Further, the portion of the gas located within the outer chamber 222 may cool via heat transfer about the wall 204, which may be exposed to an external environment having an ambient temperature less than the temperature of the gas. As the portion of the gas within the outer chamber 222 cools, similar heat transfer may occur about the baffle 202, as the portion of the gas remaining within the inner chamber 220 may exhibit a higher temperature than the now-cooled portion of gas within the outer chamber 222.

The support(s) 206 may further facilitate heat transfer between the inner chamber 220, the outer chamber 222, and the external environment. Specifically, the channel 214 may receive ambient air from the external environment, which may be substantially cooler than the gas within the baffle structure 200. The portion of the gas within the outer chamber 222 may contact the surfaces of the support(s) 206, thereby providing for heat transfer between the outer chamber 222 and the external environment. The support(s) 206 may be designed to optimize heat transfer in this manner. For example, each support 206 may define an airfoil profile to encourage the flow of gas around the surface of the support 206. Such an airfoil profile may be symmetrical or cambered by design and may further define a cross-sectional profile for generating more or less lift or drag of the gas. For instance, the cross-sectional profile may be still further defined by a teardrop or finlike shape designed to affect lift or drag of the gas about the surface of each support 206, thereby facilitating the flow of gas in a preferred manner. Additionally, should the channel 214 be scaled at one end by an outer surface of the baffle 202, the cooler ambient air may contact a portion of the baffle 202, thereby acting as a heat sink and providing for heat transfer between the external environment and the inner chamber 220.

Inclusion of the support(s) 206 may improve the overall structural strength of the baffle structure 200, providing for still further optimization of the baffle structure 200 and its various components. For example, the support(s) 206 may make it feasible for the baffle structure 200 to be formed from different materials than would otherwise be possible due to minimum structural strength or thermal conductivity requirements associated with a different baffle structure lacking the support(s) 206. This may provide for the use of lighter, less expensive, or more readily available materials than those used in existing sound suppressors and their components. By improving the structural strength of the baffle structure 200, the support(s) 206 may further allow for selective thinning of various components of the baffle structure 200 (or portions thereof). Such selective thinning may reduce an overall weight of the baffle structure 200, provide for improved aerodynamics within the baffle structure 200, and facilitate preferable heat transfer and cooling of gas within the baffle structure 200. The improved heat transfer and cooling may be accomplished, for example, by maximizing surface area available for thermal conductivity (which might otherwise be lost to provide for sufficient structural strength) and by further reducing thermal insulation between the various hollow portions of the baffle structure 200 that may receive the gas intended for cooling.

The temperatures and pressures of the various portions of the gas may ultimately normalize within the baffle structure 200 before exiting via the aperture 212 at a reduced velocity. Accordingly, where the baffle structure 200 is used as a component of a sound suppressor, the baffle structure 200 may assist in attenuating a noise otherwise associated with the sudden release of pressurized and high-temperature gas into an external environment at a high velocity, as would be the case with an unsuppressed discharge of a firearm.

Referring now to FIGS. 3A-3F, an example baffle structure in accordance with one or more embodiments of the present disclosure is illustrated. As shown throughout FIGS. 3A-3F, and in brief overview, baffle structure 300 may include inner baffle 302, outer baffle 304, and a structural component such as wall 306. One or more inner supports 316 may extend between the inner baffle 302 and the outer baffle 304. One or more outer supports 318 may extend between the outer baffle 304 and the structural component. It should be appreciated that baffle structure 300 may be a component of the sound suppressor 100 of FIG. 1 (e.g., forming at least part of baffle stack 104) and may be the same as or similar to baffle structure 200 of FIGS. 2A-2D, the baffle structures of FIG. 4, or the various baffle structures described in any of FIGS. 1, 2A-2D, or 4, or may be a different baffle structure. In a similar manner, various components and features associated with baffle structure 200 may be the same as or similar to various components and features associated with any of the baffle structures described or envisioned herein, or may be different components. It will further be understood that baffle structure 300 may exhibit any of the preferable performance characteristics described with respect to baffle structure 200 of FIGS. 2A-2D, the baffle structures of FIG. 4, or any other baffle structure described herein or otherwise envisioned by the present disclosure.

Figure 3A:
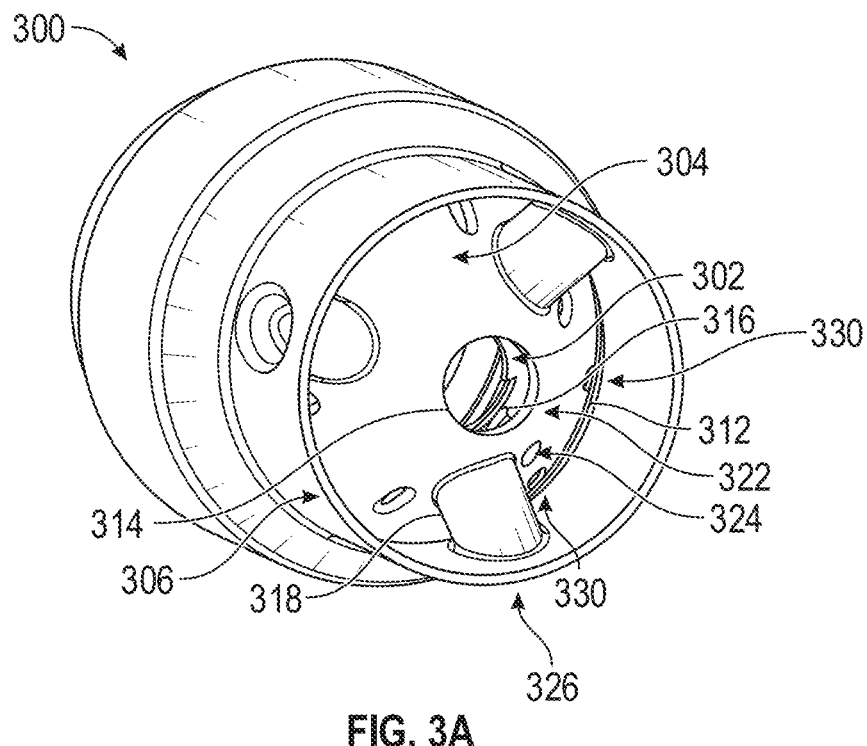
FIGS. 3A-3F are, respectively, a first perspective view, a second perspective view, a first side view, a first cross-sectional view, a second side view, and a second cross-sectional view of a baffle structure in accordance with one or more example embodiments of the disclosure.
Figure 3B:
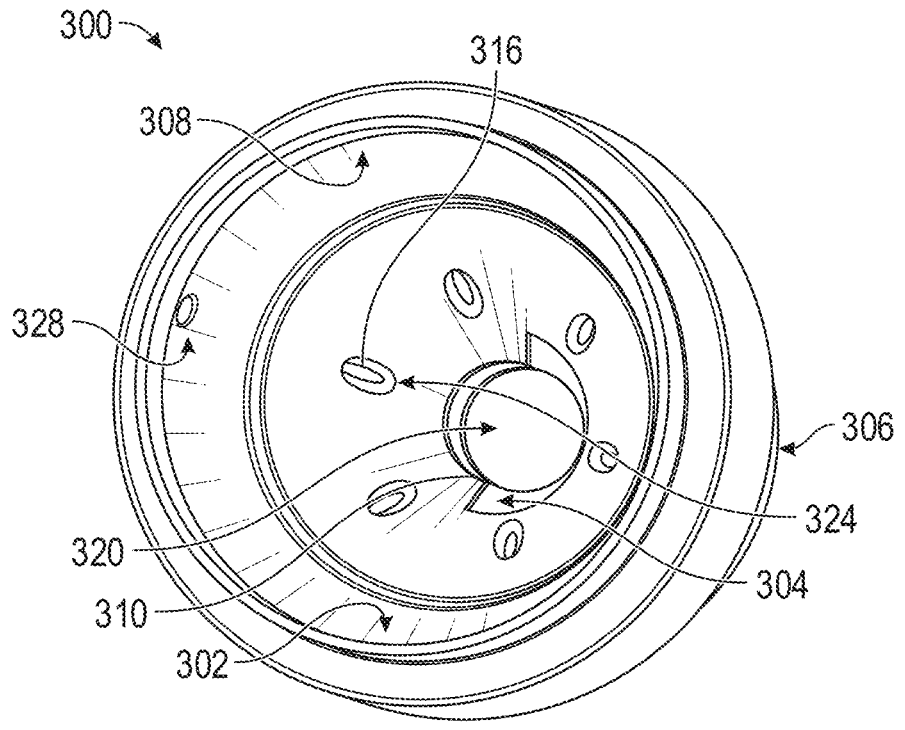
Figure 3C:
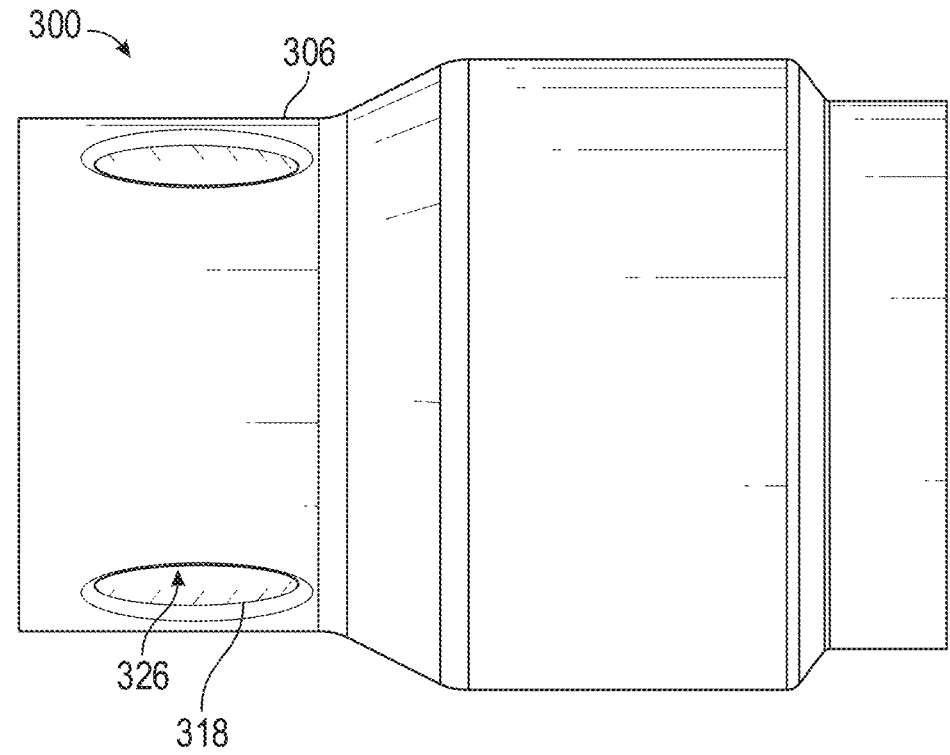
Figure 3D:
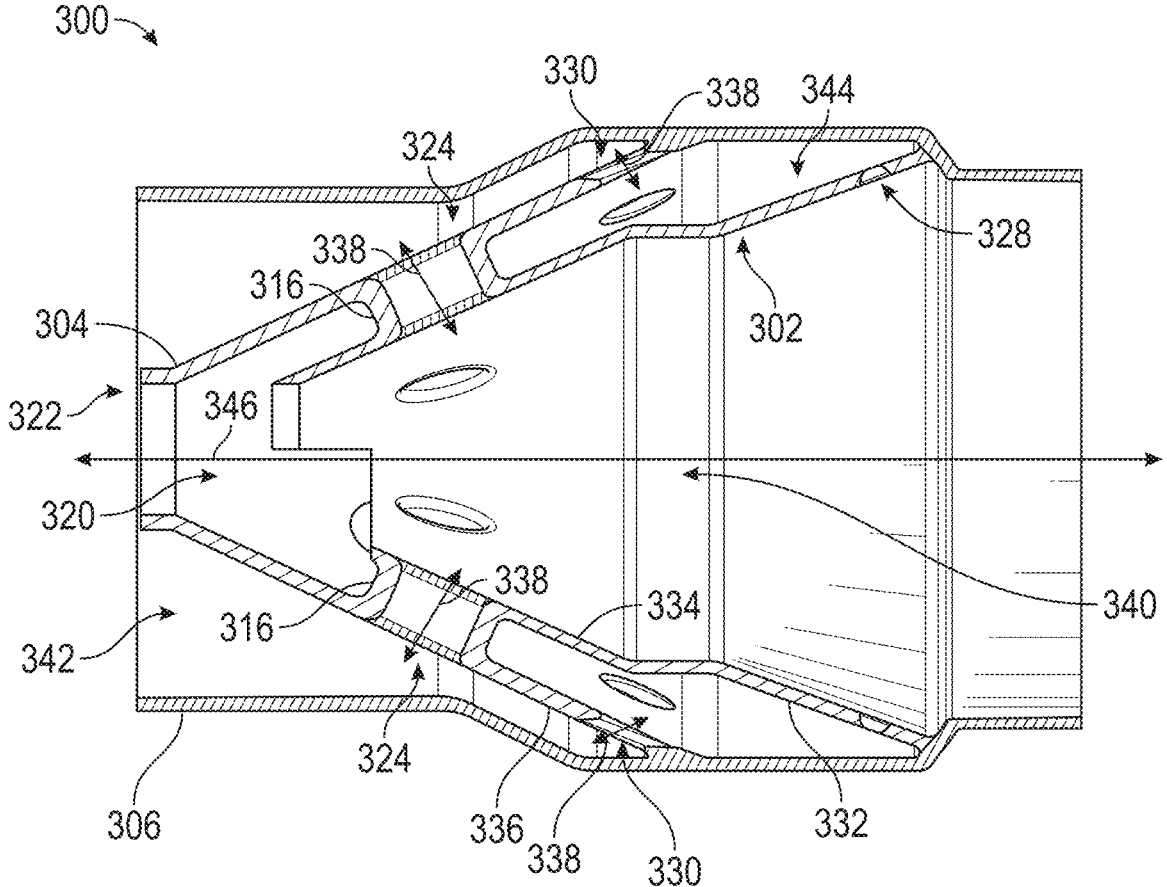
Figures 3E, 3F:
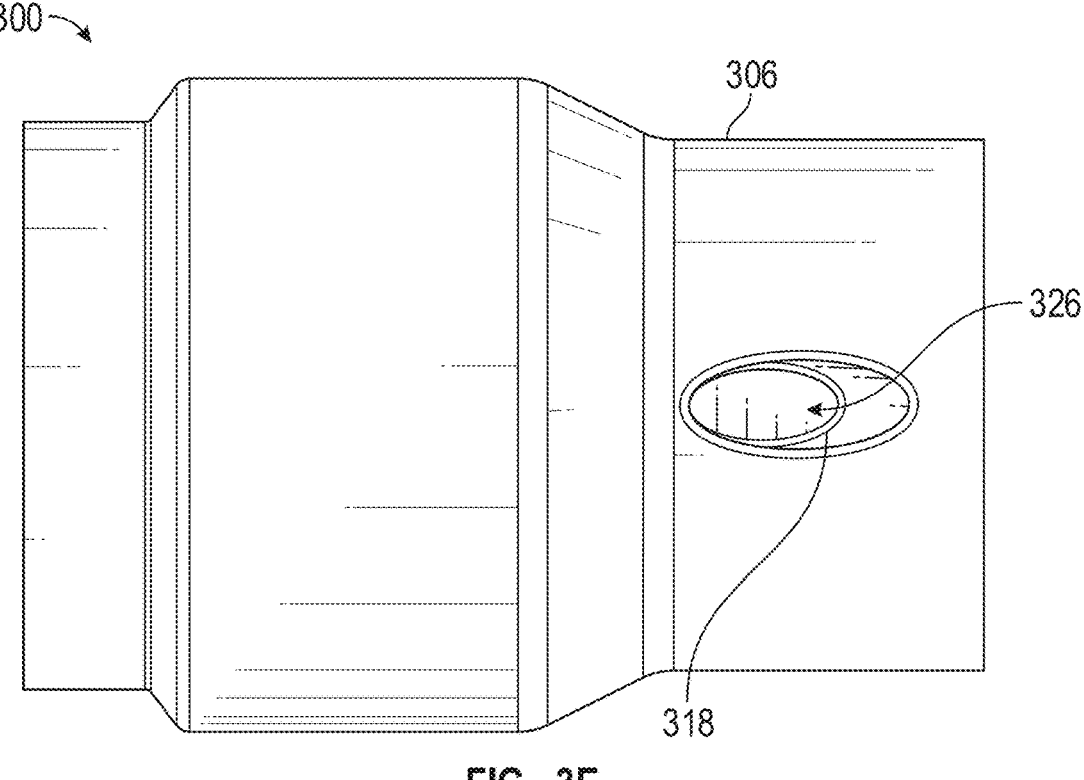

As shown in FIGS. 3A-3B, the inner baffle 302 may define a profile extending from major diameter 308 to minor diameter 310. The minor diameter 310 may be smaller than the major diameter 308 such that the inner baffle 302 defines a tapered profile. The inner baffle 302 may further define aperture 320 about a transverse axis of the minor diameter 310. The outer baffle 304 may define another profile extending from major diameter 312 to minor diameter 314 such that the outer baffle 304 may define a corresponding tapered profile. The outer baffle 304 may further define aperture 322 about a transverse axis of the minor diameter 314. The various dimensions of the inner baffle 302 and the outer baffle 304 may be such that the inner baffle 302 may be located substantially within the outer baffle 304. Aperture 320 and aperture 322 may share the same transverse axis. Accordingly, a projectile from a firearm cartridge may travel along the transverse axis without contacting either the inner baffle 302 or the outer baffle 304.

In the present embodiment, the structural component is wall 306, which may form at least part of a wall of a sound suppressor (e.g., wall 106 of sound suppressor 100, illustrated in FIG. 1). However, in other embodiments, the structural component may be another baffle. For example, the outer support(s) 318 may extend from the outer baffle 304 to another baffle where the baffle structure 300 is designed to be installed within a separate housing (not shown) or where the baffle structure 300 includes another structural component connected to the outer baffle 304 or another baffle by one or more additional supports. In this manner, the baffle structure 300 may include any number of baffles connected to one another by any number of supports.

Each inner support 316 may define channel 324 between the inner baffle 302 and the outer baffle 304. Each outer support 318 may define channel 326. The inner support(s) 316 may have a similar or different design as compared to the outer support(s) 318. Similarly, channel 324 may have a similar or different design as compared to channel 326. For example, the outer support(s) 318 may be larger or smaller in size than the inner support(s) 316. The baffle structure 300 may include more or less inner support(s) 316 than outer support(s) 318. Channel 324 and channel 326 may each be open or sealed at one or both ends. In the present embodiment, for instance, channel 324 is open at both ends, whereas channel 326 is sealed at one end by the outer baffle 304.

The inner baffle 302 and the outer baffle 304 may include one or more holes to facilitate a flow of gas within the baffle structure 300. For example, one or more holes 328 may be located about the inner baffle 302. One or more holes 330 may be located about the outer baffle 304. Hole(s) 328 may have similar or different dimensions, shapes, orientations, and quantity as compared to hole(s) 330.

It will be understood by those having skill in the art that the enumerated designs are merely illustrative and that numerous other designs of the baffle structure 300 and its various components are envisioned by the present disclosure. As will be further understood by those having skill in the art, baffle structure 300 may provide at least the same or similar design benefits as those described with respect to baffle structure 200 of FIGS. 2A-2D, as well as additional beneficial features (further described below). For example, the inner support(s) 316 and the outer support(s) 318 may provide the baffle structure 300 with improved structural strength, rigidity, weight, heat transfer and gaseous expansion characteristics, and manufacturing costs in a similar manner as provided to the baffle structure 200 by the support(s) 206 of FIGS. 2A-2D. Moreover, the ability to customize the baffle structure 300 by including different types or numbers of baffles, supports, holes, and the like only further increases the potential for optimization envisioned by the present disclosure. In this manner, the baffle structure 300 may offer still further improvements over existing baffle structures intended for use as components of sound suppressors.

As shown in FIGS. 3C-3F, the baffle structure 300 may include any number of inner support(s) 316 and outer support(s) 318 in any number of configurations. For example, the inner support(s) 316 may be concentrically located about the inner baffle 302. The outer support(s) 318 may be concentrically located about the outer baffle 304 at a similar or different angle as compared to that of the inner support(s) 316 and in the same or a different quantity. The inner support(s) 316 and the outer support(s) 318 may be arranged in any orientation that exhibits preferable structural characteristics and heat transfer for a given assembly or operative environment. As one example, the respective orientations of the inner support(s) 316 and the outer support(s) 318 may or may not be substantially similar to one another (e.g., equally spaced and/or angled with respect to a shared reference axis). As another example, the inner support(s) 316 may be located such that they would effectively extend into the outer support(s) 318 but for their separation by the outer baffle 304. As yet another example, the inner support(s) 316 and/or the outer support(s) 318 may be arranged in an asymmetrical orientation with respect to one or more axes of the baffle structure 300 to improve structural strength and/or heat transfer.

Each inner support 316 may define its own channel 324, while each outer support 318 may define its own channel 326. Depending on location and preferred functionality, the channel 324 and the channel 326 may be sealed at one or both ends or may be open at both ends. For example, it may be preferable to seal the channel 326 at one end where the channel 326 extends to an external environment so as to retain pressurized gas within the baffle structure 300. In contrast, the channel 324 might be left open at both ends to better facilitate a flow of the pressurized gas within the baffle structure 300. Further still, one or more inner support(s) 316 and/or outer support(s) 318 may respectively lack the channel 324 or the channel 326 altogether, being substantially solid.

Numerous profiles and directional orientations of the channel 324 and the channel 326 are further envisioned by the present disclosure. As some examples, the channel 324 and the channel 326 may be substantially cylindrical in profile, may taper at one or both ends, or may have any other profile suitable for a channel and for providing the inner support(s) 316 and the outer support(s) 318 with preferred structural and heat transfer characteristics. The channel 324 and the channel 326 may be oriented at any positive or negative angle or may be normal with respect to the inner baffle 302, the outer baffle 304, the wall 306, or any other component of the baffle structure 300. Similarly, the channel 324 and the channel 326 may be oriented at any positive or negative angle or may be normal with respect to firing axis 346.

The inner baffle 302 may be formed from skirt 332 connected to cone 334, which may further define the profile of the inner baffle 302. The skirt 332 and the cone 334 may, in additional to exhibiting preferable structural characteristics, facilitate the flow of gas in a preferred, potentially nonlinear, manner, such as that depicted by flow 338. The outer baffle may correspondingly be formed from at least cone 336 and may or may not have a skirt (not shown) connected to the cone 336. The cone 336 may also exhibit preferable structural characteristics and facilitation of flow 338. For example, the skirt 332, the cone 334, and the cone 336 may affect flow 338 about their respective internal and external surfaces. As further examples, the cone 334 and the cone 336 may provide for substantially linear flow 338 about their respective surfaces, while the skirt 332 may redirect flow 338 about an angled portion of its surfaces. Moreover, the skirt 332 may be structurally designed to facilitate engagement of the baffle structure 300 with another baffle structure during formation of a baffle stack.

Cone 334 may define aperture 320, while cone 336 may define aperture 322. Aperture 320 and aperture 322 may share the same or a substantially similar transverse axis, thereby defining the firing axis 346. In turn, the firing axis 346 may correspond to a longitudinal axis of a barrel of a firearm to which the baffle structure 300 is attached as part of a sound suppressor. A projectile from a firearm cartridge may thereby exit the barrel of the firearm and travel along the firing axis 346 without contacting the inner baffle 302 or the outer baffle 304. Flow 338 may initially enter the baffle structure 300 along the firing axis 346, propelling the projectile from the barrel and through aperture 320 and aperture 322 before exiting the baffle structure 300.

Flow 338 may be further altered by the design of aperture 320 and/or aperture 322. For example, aperture 320 may be asymmetrically defined by cone 334 about the firing axis 346, whereas aperture 322 may be symmetrically defined by cone 336 about the firing axis 346. In this manner, aperture 320 and aperture 322 may cause a "whirling" motion of flow 338, which may affect a trajectory of the projectile as it is propelled in front of flow 338. Although not entirely similar, the effect of this whirling motion on the projectile may be somewhat analogous to the spin provided to a projectile by a rifled barrel of a firearm.

The inner baffle 302, the outer baffle 304, and the wall 306 may define multiple chambers within the baffle structure 300, which may be accessible from various points within or about the baffle structure 300. For example, the inner baffle 302 may define inner chamber 340, which may receive pressurized gas generated during discharge of a firearm while remaining separated from an external environment except via the aperture 320 (or, in some assemblies, an opposing end of the baffle structure). Outer chamber 342 may be defined by a hollow volume between the outer baffle 304 and the wall 306. The inner chamber 340 and the outer chamber 342 may be separated from one another by intermediate chamber 344, which may be defined by a different hollow volume between the inner baffle 302 and the outer baffle 304.

At various locations, the flow 338 of the pressurized gas within the baffle structure 300 may be substantially linear or nonlinear as defined by the internal configuration of the baffle structure 300. For example, the flow 338 may enter the inner chamber 340 of the baffle structure 300 along the firing axis 346 at a high velocity following a projectile, the gas being highly pressurized and exhibiting a high temperature immediately following a discharge of the firearm by which the pressurized gas was generated. As the projectile exits the baffle structure 300, the pressurized gas may expand within the inner chamber 340.

With the pressurized gas expanding and dispersing, the flow 338 may follow various pathways within the baffle structure. For example, the flow 338 may continue in a substantially linear direction along the firing axis 346, restricted only by the projectile until the projectile exits the baffle structure 300 in its entirety. While restricted by the projectile, the flow 338 may instead travel between the inner chamber 340 and the outer chamber 342 via the channel 324 defined by each inner support 316, bypassing the intermediate chamber 344. Alternatively, or in addition, the flow 338 may travel between the inner chamber 340, the intermediate chamber 344, and the outer chamber 342 via the hole(s) 328 and the hole(s) 330.

Depending on whether the channel 324 and the channel 326 are sealed at one end or open at both ends, each inner support 316 and outer support 318 may act as a heat sink or provide a pathway through which the flow 338 may travel. In the present embodiment, for instance, the channel 324 is open at both ends, allowing the flow 338 to travel between the inner chamber 340 and the outer chamber 342, while the channel 326 is sealed at one end by the outer baffle 304, thereby preventing the flow 338 from escaping to an external environment except by some alternate pathway. At the same time, differing temperatures of the gas within various portions of the baffle structure 300 may allow each inner support 316 to act as a heat sink for the intermediate channel 344 and each outer support 318 to act as a heat sink for the outer chamber 342 with varying impact on the overall rate of heat transfer between the interior volume of the baffle structure 300 and the external environment.

As pressurized gas travels about the inner chamber 340, the outer chamber 342, and the intermediate chamber 344 via flow 338, the gas may expand and thereby decrease in pressure. Further, the various portions of the gas contained within the different chambers may cool via heat transfer about the inner baffle 302, the outer baffle 304, and the wall 306 with varying efficacy based on the relative temperatures in the surrounding chambers. Acting as heat sinks, the inner support(s) 316 and the outer support(s) 318 may further affect the relative cooling rates of those portions of the gas contained within the inner chamber 340, the outer chamber 342, and the intermediate chamber 344.

The temperatures and pressures of the various portions of the gas may ultimately normalize within the baffle structure 300 before exiting via the aperture 322 at a reduced velocity following the exit of the projectile from the baffle structure 300. Accordingly, where the baffle structure 300 is used as a component of a sound suppressor, the baffle structure 300 may assist in attenuating a noise otherwise associated with the sudden release of pressurized and high-temperature gas into an external environment at a high velocity, as would be the case with an unsuppressed discharge of a firearm.

It will be understood by those having skill in the art that countless other variations of the inner support(s) 316, the outer support(s) 318, the hole(s) 328, the hole(s) 330, and the various other components of the baffle structure 300 are envisioned by the present disclosure, each variation defining its own unique flow 338. As such, the present disclosure provides nearly limitless possibilities for sound attenuation and associated performance characteristics attributed to the baffle structure 300 when used as a component of a sound suppressor.

Figure 4:
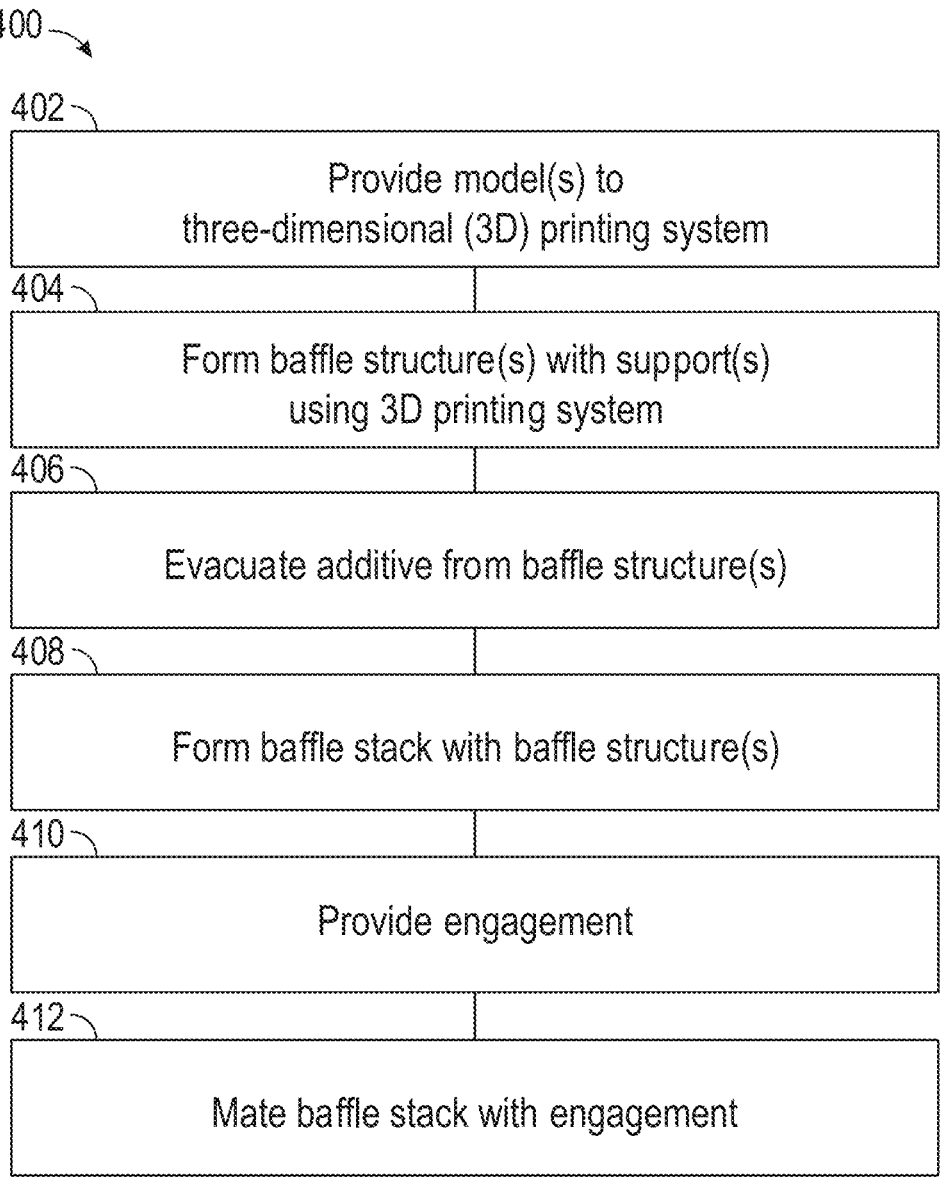
FIG. 4 is a schematic illustration of an example process flow for manufacturing a sound suppressor in accordance with one or more example embodiments of the disclosure.
Figure 5A:
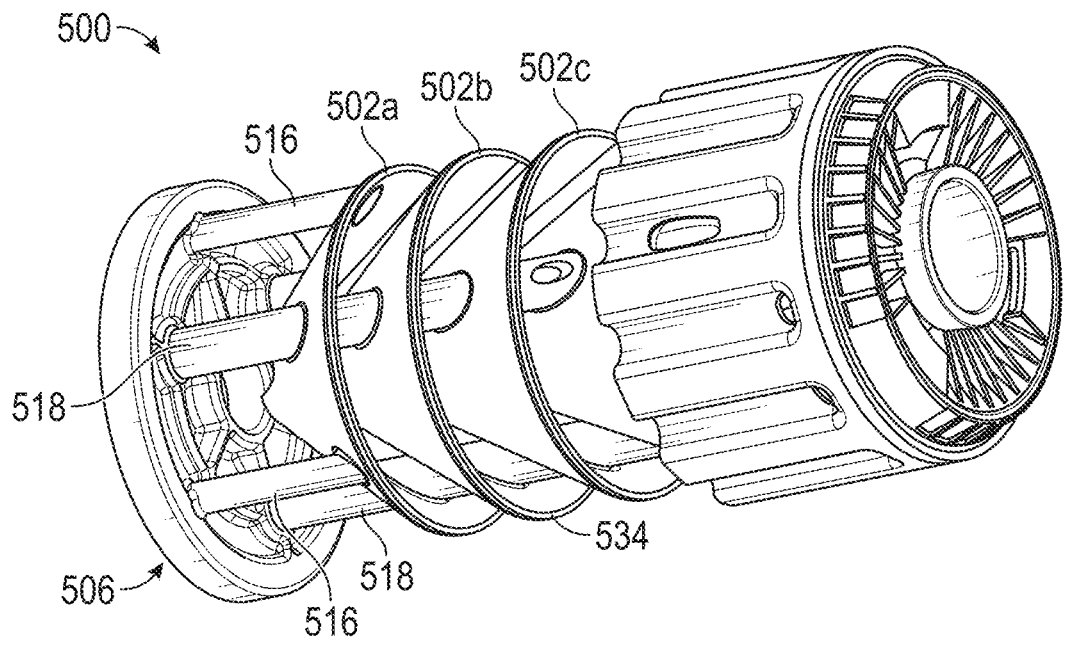
FIGS. 5A-5F are, respectively, a first perspective view, a second perspective view, a first side view, a first cross-sectional view, a second side view, and a second cross-sectional view of a baffle structure in accordance with one or more example embodiments of the disclosure.
Figure 5B:
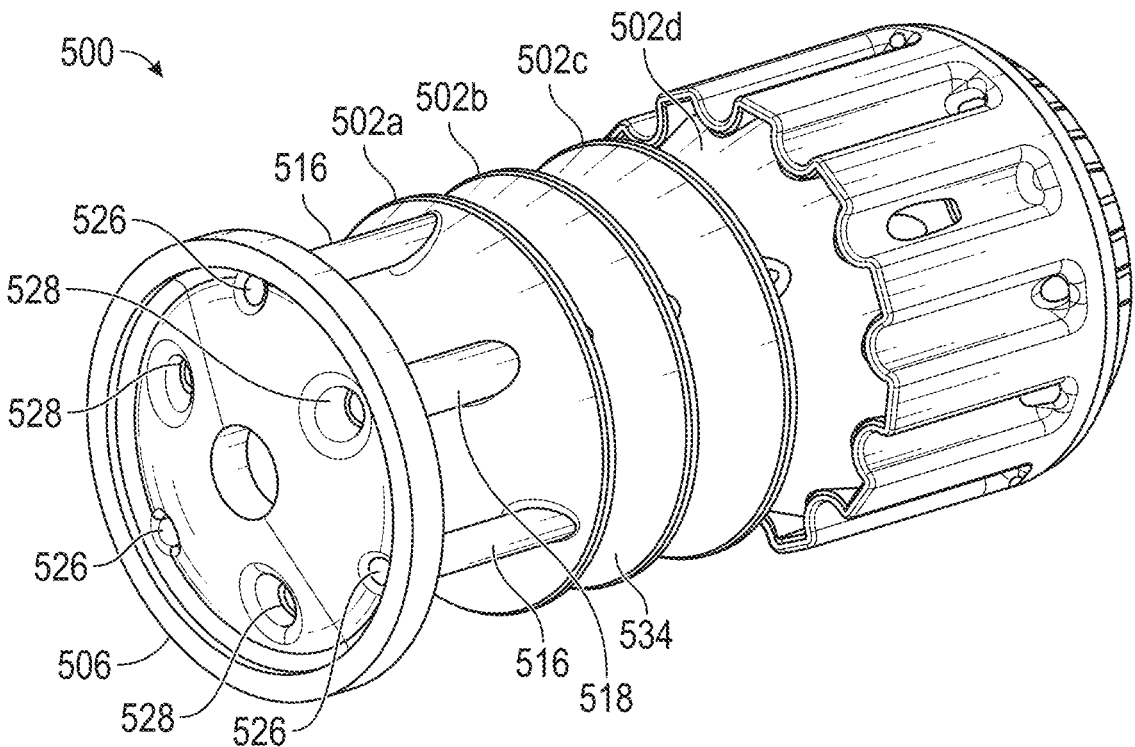
Figure 5C:
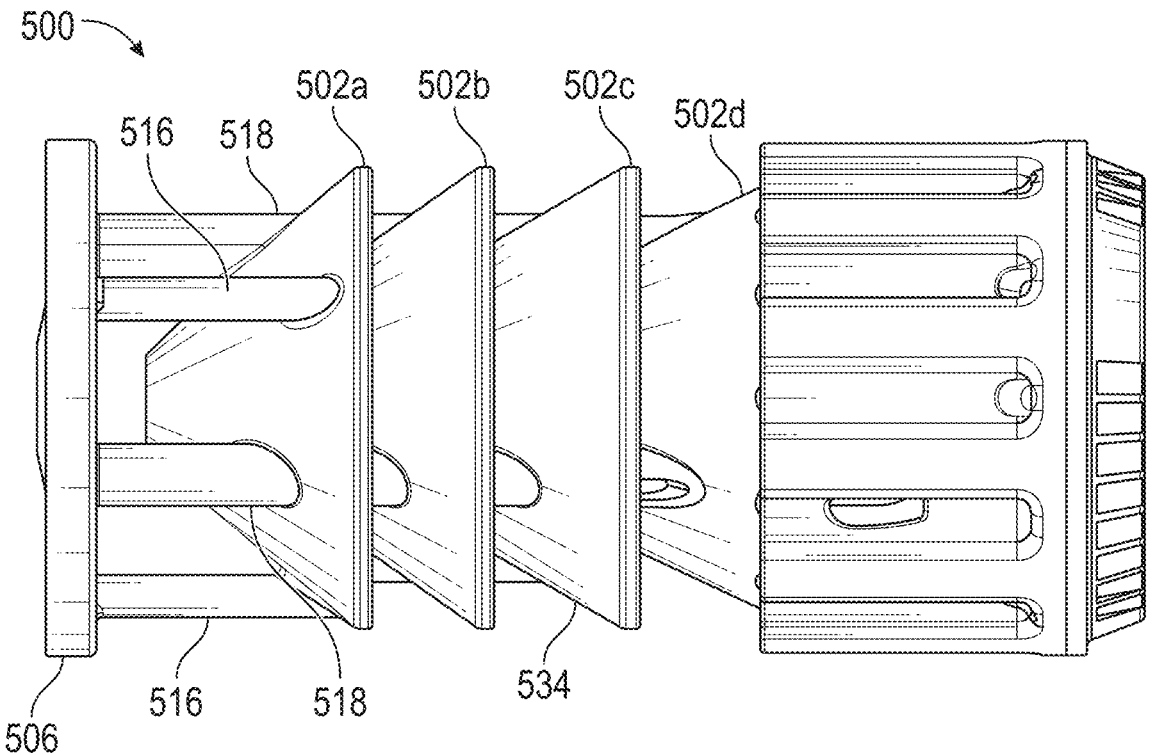
Figure 5D:
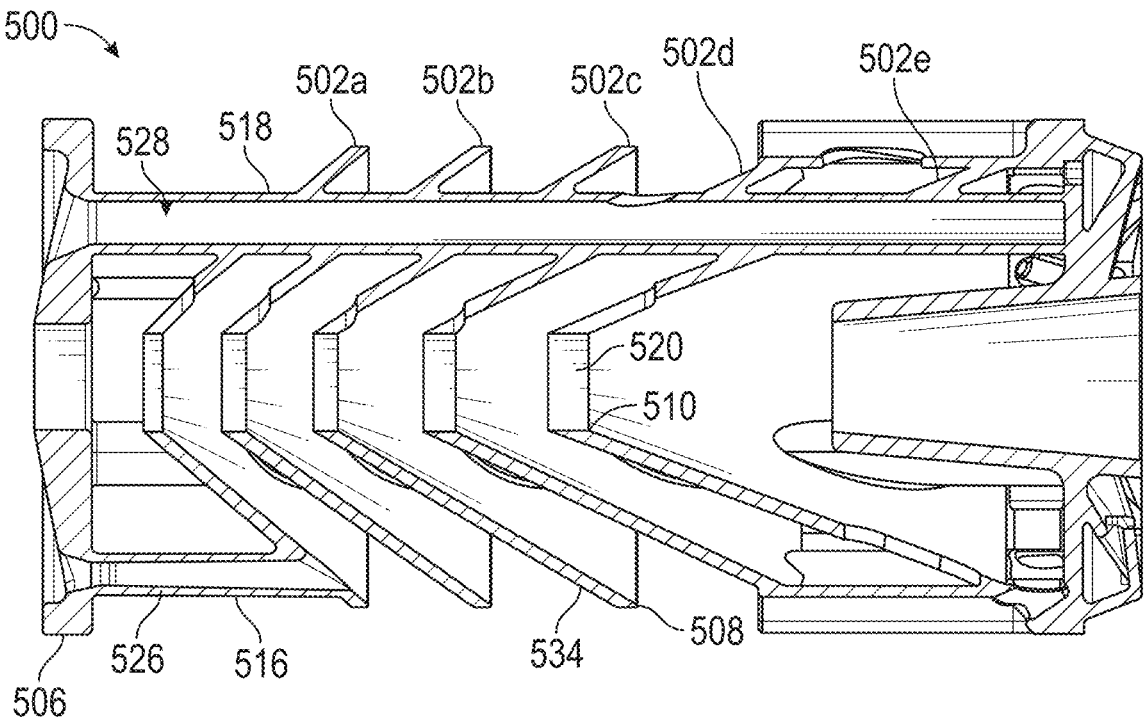
Figure 5E:
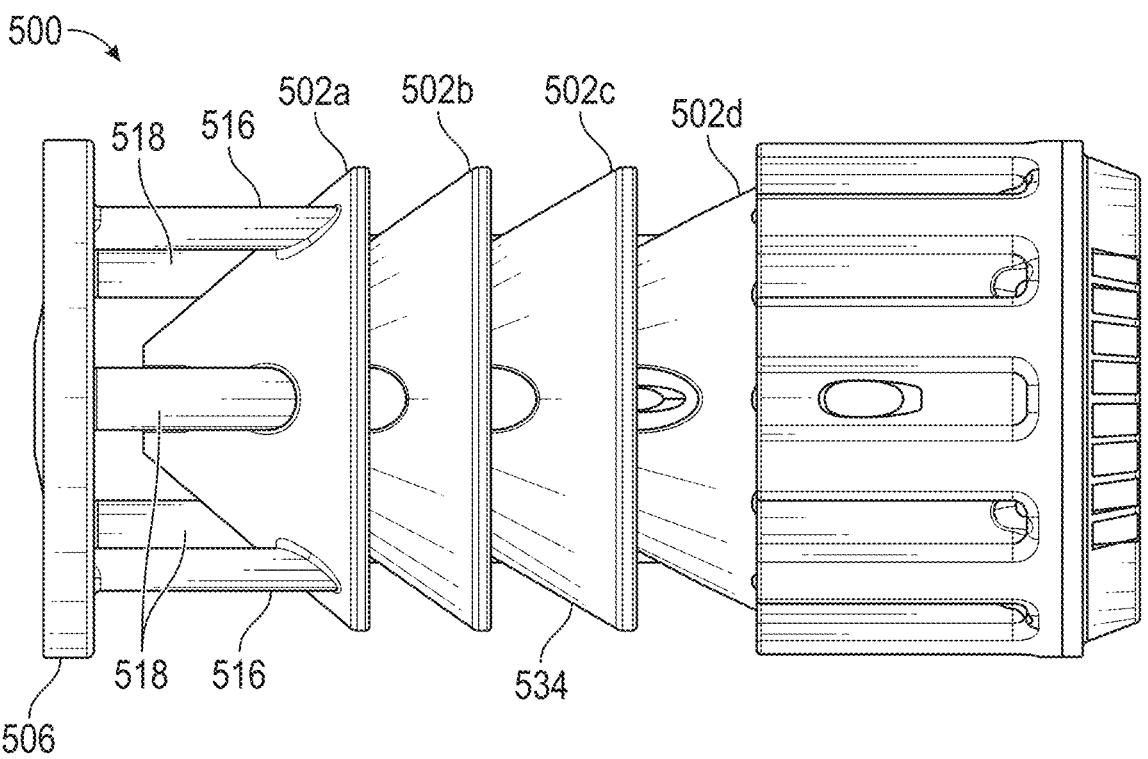
Figure 5F:
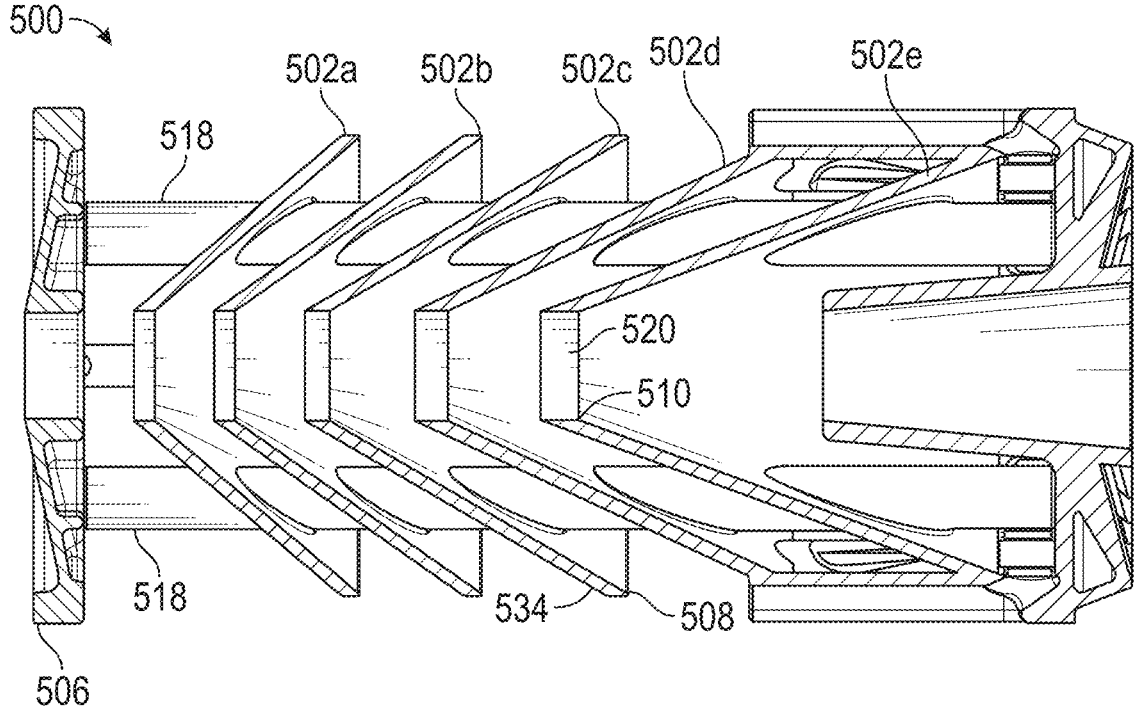

Referring now to FIG. 4, an example process flow for manufacturing a sound suppressor is illustrated. As shown in FIG. 4, and in brief overview, process flow 400 may include block 402, block 404, block 406, block 408, block 410, and/or block 412. It should be appreciated that the operations of the process flow 400 may be optional, may be performed in any order, and/or may include additional or alternative operations described herein or otherwise envisioned by the present disclosure but not illustrated in FIG. 4, as will be understood by those having skill in the art. It will further be understood that the sound suppressor of FIG. 4 may be the same as or similar to sound suppressor 100 of FIG. 1, or otherwise may be one or more of the sound suppressors of FIGS. 1, 2A-2D, 3A-3F, and 5A-5F. Moreover, the baffle structure of FIG. 4 may be the same as or similar to baffle structure 200 of FIGS. 2A-2D, baffle structure 300 of FIGS. 3A-3F, baffle structure 500 of FIGS. 5A-5F, or otherwise may be one or more of the baffle structures of FIGS. 1, 2A-2D, 3A-3F, and 5A-5F. Further still, the various components associated with the sound suppressor and/or the baffle structure of FIG. 4 may be the same as or similar to one or more components associated with the various sound suppressors and/or baffle structures described throughout FIGS. 1, 2A-2D, 3A-3F, and 5A-5F.

At block 402, one or more models are provided to a 3D printing system. Each model may include data for forming, by 3D printing, one or more components of the sound suppressor. For example, a model may include data for forming one or more baffle structures by a 3D printing process of the 3D printing system. Alternatively, or in addition, a different model may include different data for forming one or more different baffle structures by the 3D printing process of the 3D printing system.

At block 404, the baffle structure(s) and/or the different baffle structure(s) may be formed, based on the data and/or the different data, using the 3D printing system. The 3D printing system may employ any suitable means of 3D printing or additive manufacturing, including but not limited to direct metal laser sintering (DMLS), binder jetting, or other powder-based 3D printing processes. Each of the baffle structure(s) and/or the different baffle structure(s) may be the same as or similar to the baffle structure 200 of FIGS. 2A-2D, the baffle structure 300 of FIGS. 3A-3F, the baffle structure 500 of FIGS. 5A-5F, or may be any other suitable baffle structure including at least one baffle and able to be formed by 3D printing or additive manufacturing. For example, each of the baffle structure(s) and/or the different baffle structure(s) may include at least one support, each support extending from a baffle to one of one or more structural components, each structural component being, for instance, another baffle or a wall. As such, the baffle structure(s) and the different baffle structure(s) may provide for the numerous benefits of the supports described throughout the present disclosure.

At block 406, a quantity of an additive associated with the 3D printing or additive manufacturing process employed by the 3D printing system may be evacuated from the baffle structure(s) and/or the different baffle structure(s). As will be understood by those having skill in the art, 3D printing processes often leave some amount of additive within components formed by the associated 3D printing systems. If the additive is wholly enclosed within those components, it may prove exceedingly difficult or impossible to remove the additive from the components, such as by evacuation. The designs of the various baffle structures described herein solve for this issue by including at least one open channel between an internal volume of each baffle structure and an external environment (e.g., channel 214 included in baffle structure 200 of FIGS. 2A-2D, channel 324 included in baffle structure 300 of FIGS. 3A-3F, or channel 526 included in baffle structure 500 of FIGS. 5A-5F), thereby facilitating evacuation of any additive remaining within the baffle structure, via the open channel, after formation of the baffle structure by 3D printing.

At block 408, a baffle stack is formed with the baffle structure(s) and/or the different baffle structure(s). By way of example, the baffle stack may be the same as or similar to the baffle stack 104 of FIG. 1, or may be any suitable baffle stack. In some embodiments, the baffle stack may be a unitary body including two or more baffle structures. In other embodiments, the baffle stack may be formed by attaching two or more separate baffle structures to each other, such as by welding or threaded engagement. For example, the one or more baffle structures may be attached to the one or more different baffle structures formed at block 404. In this manner, the baffle stack may be highly modular in nature, thereby providing for an extensive degree of customization according to one or more preferred performance characteristics of the sound suppressor to be manufactured.

At block 410, an engagement may be provided. The engagement may be the same as or similar to the engagement 102 of FIG. 1, or may be any suitable engagement. The engagement may be machined, for example, from a metal or a metal alloy. The engagement may be designed to attach to a barrel of a firearm, such as by threading.

At block 412, the baffle stack may be mated with the engagement. For example, the baffle stack may be welded to the engagement at an end opposite that designed to attach to the barrel of the firearm. As attached, the engagement and the baffle stack may define a firing axis corresponding to a longitudinal axis of the barrel of the firearm. In this manner, the engagement and the baffle may form the sound suppressor, which may be appropriate for use with the firearm as a sound attenuation device.

Referring now to FIGS. 5A-5F, an example baffle structure in accordance with one or more embodiments of the present disclosure is illustrated. As shown throughout FIGS. 5A-5F, and in brief overview, baffle structure 500 may include a plurality of baffles 502 (in the illustrated example, a first baffle 502*a*, a second baffle 502*b*, a third baffle 502*c*, a fourth baffle 502*d*, and a fifth baffle 502*c*) and a structural component such as wall 506. One or more first supports 516 may extend between the first baffle 502*a* and the structural component. One or more second supports 518 may extend between the fifth baffle 502*e* and the structural component and through each of the first baffle 502*a*, the second baffle 502*b*, the third baffle 502*c*, and the fourth baffle 502*d*. It should be appreciated that the baffle structure 500 may be a component of the sound suppressor 100 of FIG. 1 (e.g., forming at least part of baffle stack 104) and may be the same as or similar to baffle structure 200 of FIGS. 2A-2D, baffle structure 300 of FIGS. 3A-3F, the baffle structures of FIG. 4, or the various baffle structures described in any of FIGS. 1, 2A-2D, 3A-3F, or 4, or may be a different baffle structure. In a similar manner, various components and features associated with baffle structure 200 or baffle structure 300 may be the same as or similar to various components and features associated with any of the baffle structures described or envisioned herein, or may be different components. It will further be understood that baffle structure 500 may exhibit any of the preferable performance characteristics described with respect to baffle structure 200 of FIGS. 2A-2D, baffle structure 300 of FIGS. 3A-3F, the baffle structures of FIG. 4, or any other baffle structure described herein or otherwise envisioned by the present disclosure.

As shown in FIGS. 5A-5F, each of the first baffle 502*a*, the second baffle 502*b*, the third baffle 502*c*, the fourth baffle 502*d*, and the fifth baffle 502*e* may define a profile extending from a major diameter 508 to a minor diameter 510. The minor diameter 510 may be smaller than the major diameter 508 such that each of the baffles 502*a*, 502*b*, 502*c*, 502*d*, 502*e* defines a tapered profile. Each of the first baffle 502*a*, the second baffle 502*b*, the third baffle 502*c*, the fourth baffle 502*d*, and the fifth baffle 502*c* may further define an aperture 520 about a transverse axis of the minor diameter 510. The various dimensions of the baffles 502*a*, 502*b*, 502*c*, 502*d*, 502*e* may be such that the second baffle 502*b* may be located substantially within the first baffle 502*a*, the third baffle 502*c* may be located substantially within the second baffle 502*b*, the fourth baffle 502*d* may be located substantially within the third baffle 502*c*, and the fifth baffle 502*e* may be located substantially within the fourth baffle 502*d*. The apertures 520 of the baffles 502*a*, 502*b*, 502*c*, 502*d*, 502*e* may share the same transverse axis. Accordingly, a projectile from a firearm cartridge may travel along the transverse axis without contacting any of the baffles 502*a*, 502*b*, 502*c*, 502*d*, 502*c*.

In the illustrated examples, the structural component is wall 506, which may form at least part of a wall of a sound suppressor (e.g., a wall of sound suppressor 100, illustrated in FIG. 1). However, in other embodiments, the structural component may be another baffle. For example, the first supports 516 and/or the second supports 518 may extend from the first baffle 502*a* to another baffle where the baffle structure 500 is designed to be installed within a separate housing (not shown) or where the baffle structure 500 includes another structural component connected to the first baffle 502*a* or another baffle by one or more additional supports. In this manner, the baffle structure 500 may include any number of baffles connected to one another by any number of supports.

Each of the first supports 516 may define a first channel 526 between the first baffle 502*a* and the wall 506. Each of the second supports 518 may define a second channel 528 between the fifth baffle 502*c* and the wall 506 and extending through each of the first baffle 502*a*, the second baffle 502*b*, the third baffle 502*c*, and the fourth baffle 502*d*. The first support(s) 516 may have a similar or different design as compared to the second support(s) 518. Similarly, the first channel 526 may have a similar or different design as compared to the second channel 528. For example, as shown, the first support(s) 516 may be smaller in diameter than the second support(s) 518, and the first channel(s) 526 may be smaller in diameter than the second channel(s) 528. According to the illustrated example, the baffle structure 500 may include three (3) of the first supports 516 circumferentially spaced apart from one another and three (3) of the second supports 518 circumferentially spaced apart from one another, with each of the second supports 518 being located circumferentially between a pair of the first supports 516. The baffle structure 500 may include more or less first support(s) 516 than second support(s) 518. The first channel(s) 526 and the second channel(s) 528 may each be open or sealed at one or both ends. In the illustrated example, for instance, each of the first channels 526 is open at both ends, whereas each of the second channels 528 is open at one end defined in the wall 506 and sealed at the other end by a distal end portion of the baffle structure 500.

It will be understood by those having skill in the art that the enumerated designs are merely illustrative and that numerous other designs of the baffle structure 500 and its various components are envisioned by the present disclosure. As will be further understood by those having skill in the art, the baffle structure 500 may provide at least the same or similar design benefits as those described with respect to baffle structure 200 of FIGS. 2A-2D, baffle structure 300 of FIGS. 3A-3F, as well as additional beneficial features (further described below). For example, the first support(s) 516 and the second support(s) 518 may provide the baffle structure 500 with improved structural strength, rigidity, weight, heat transfer and gaseous expansion characteristics, and manufacturing costs in a similar manner as provided to the baffle structure 200 by the support(s) 206 of FIGS. 2A-2D and/or the baffle structure 300 by the inner support(s) 316 and the outer support(s) 318 of FIGS. 3A-3F. Moreover, the ability to customize the baffle structure 500 by including different types or numbers of baffles, supports, holes, and the like only further increases the potential for optimization envisioned by the present disclosure. In this manner, the baffle structure 500 may offer still further improvements over existing baffle structures intended for use as components of sound suppressors.

As shown in FIGS. 5A-5F, the baffle structure 500 may include any number of the first support(s) 516 and the second support(s) 518 in any number of configurations. For example, the first support(s) 516 may be concentrically located about the baffles 502*a*, 502*b*, 502*c*, 502*d*, 502*c*. The second support(s) 518 may be concentrically located about the baffles 502*a*, 502*b*, 502*c*, 502*d*, 502*c* at a similar or different angle as compared to that of the first support(s) 516 and in the same or a different quantity. The first support(s) 516 and the second support(s) 518 may be arranged in any orientation that exhibits preferable structural characteristics and heat transfer for a given assembly or operative environment. As one example, the respective orientations of the first support(s) 516 and the second support(s) 518 may or may not be substantially similar to one another (e.g., equally spaced and/or angled with respect to a shared reference axis). As another example, the first support(s) 516 and/or the second support(s) 518 may be arranged in an asymmetrical orientation with respect to one or more axes of the baffle structure 500 to improve structural strength and/or heat transfer.

Each first support 516 may define its own first channel 526, while each second support 518 may define its own second channel 528. Depending on location and preferred functionality, the first channel 526 and the second channel 528 may be sealed at one or both ends or may be open at both ends. For example, it may be preferable to seal the second channel 528 at one end where the second channel 528 extends to an external environment so as to retain pressurized gas within the baffle structure 500. In contrast, the first channel 526 might be left open at both ends to better facilitate a flow of the pressurized gas within the baffle structure 500. Further still, one or more first support(s) 516 and/or second support(s) 518 may respectively lack the channel 526 or the channel 528 altogether, being substantially solid.

Numerous profiles and directional orientations of the first channel 526 and the second channel 528 are further envisioned by the present disclosure. As some examples, the first channel 526 and the second channel 528 may be substantially cylindrical in profile, may taper at one or both ends, or may have any other profile suitable for a channel and for providing the first support(s) 516 and the outer support(s) 518 with preferred structural and heat transfer characteristics. The first channel 526 and the second channel 528 may be oriented at any positive or negative angle or may be normal with respect to the wall 506, one or more of the baffles 502*a*, 502*b*, 502*c*, 502*d*, 502*c*, or any other component of the baffle structure 500. Similarly, the first channel 526 and the second channel 528 may be oriented parallel with respect to the firing axis, as shown, or the first channel 526 and the second channel 528 may be oriented at any positive or negative angle or may be normal with respect to the firing axis.

As shown, each of the baffles 502*a*, 502*b*, 502*c*, 502*d*, 502*e* may be formed from a cone 534 and may not have a skirt connected to the cone 534. By not having a skirt, removal of 3D-printing additive material from around the baffles 502*a*, 502*b*, 502*c*, 502*d*, 502*e* may be easier, as compared to baffles having skirts that at least partially form the outer wall of the suppressor and present challenges in removal of the additive material. In some examples, one or more of the baffles 502*a*, 502*b*, 502*c*, 502*d*, 502*e* may be further formed from a skirt (not shown) connected to the cone 534, which may further define the profile of the baffle(s) 502*a*, 502*b*, 502*c*, 502*d*, 502*c*. The cone 534 and/or the skirt may, in additional to exhibiting preferable structural characteristics, facilitate the flow of gas in a preferred, potentially nonlinear, manner. The cones 534 of the baffles 502*a*, 502*b*, 502*c*, 502*d*, 502*e* may define the respective apertures 520 thereof. The apertures 520 may share the same or a substantially similar transverse axis, thereby defining the firing axis. In turn, the firing axis may correspond to a longitudinal axis of a barrel of a firearm to which the baffle structure 500 is attached as part of a sound suppressor. A projectile from a firearm cartridge may thereby exit the barrel of the firearm and travel along the firing axis without contacting the baffles 502*a*, 502*b*, 502*c*, 502*d*, 502*c*. Flow may initially enter the baffle structure 500 along the firing axis, propelling the projectile from the barrel and through the apertures 520 before exiting the baffle structure 500.

It will be understood by those having skill in the art that countless other variations of the first support(s) 516, the second support(s) 518, the first channel(s) 526, the second channel(s) 528, and the various other components of the baffle structure 500 are envisioned by the present disclosure, each variation defining its own unique flow. As such, the present disclosure provides nearly limitless possibilities for sound attenuation and associated performance characteristics attributed to the baffle structure 500 when used as a component of a sound suppressor.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A sound suppressor, comprising:
   an engagement, configured to mate with a barrel of a firearm; and
   a first baffle structure, mated to the engagement, including:
   a first baffle, having a first cone, defining a first profile extending from a first diameter to a second diameter, the second diameter being smaller than the first diameter,
   a first structural component, wherein the first structural component is one of a second baffle or a wall of the sound suppressor, and
   a first support extending from the first baffle to the first structural component, wherein the first support defines a first channel disposed within the first support.

2. The sound suppressor of claim 1, wherein the first channel is sealed at one end.

3. The sound suppressor of claim 1, wherein of the first support extends from the first cone of the first baffle to the first structural component.

4. The sound suppressor of claim 1, wherein one or more holes are disposed in at least one of the first baffle, first support or the first structural component.

5. The sound suppressor of claim 1, wherein of the first support defines an airfoil profile.

6. The sound suppressor of claim 1, wherein the first baffle structure further includes:

a second structural component, wherein the second structural component is one of a third baffle or the wall of the sound suppressor, and one or more second supports, extending from the first structural component to the second structural component, wherein the first structural component is the second baffle, and wherein the second baffle has a second cone and defines a second profile extending from a third diameter to a fourth diameter, the fourth diameter being smaller than the third diameter.

7. The sound suppressor of claim 6, wherein at least one of the one or more second supports defines a second channel between the second baffle and the second structural component.

8. The sound suppressor of claim 7, wherein the second channel is sealed at one end.

9. The sound suppressor of claim 1, further comprising a second baffle structure including at least one additional baffle, wherein the first baffle structure and the second baffle structure form a baffle stack.

10. The sound suppressor of claim 9, wherein the baffle stack is a unitary body.

11. The sound suppressor of claim 9, wherein the baffle stack is formed by mating the second baffle structure to the first baffle structure.

12. The sound suppressor of claim 1, wherein the first baffle structure is formed by three-dimensional (3D) printing.

13. The sound suppressor of claim 1, wherein the first baffle structure is mated to the engagement by welding.

14. The sound suppressor of claim 1, wherein the first channel is sealed at one end.

15. A method for manufacturing a sound suppressor, comprising:

providing a first model to a three-dimensional (3D) printing system, wherein the first model includes first data for forming, by 3D printing, a first baffle structure; and forming, by the 3D printing system and based on the first data, the first baffle structure, wherein the first baffle structure includes:

a first baffle, having a first cone, defining a first profile extending from a first diameter to a second diameter, the second diameter being smaller than the first diameter, a first structural component, wherein the first structural component is one of a second baffle or a wall, and a first support extending from the first baffle to the first structural component, wherein the first support defines a first channel disposed within the first support.

16. The method of claim 15, further comprises evacuating, via the first channel, a quantity of an additive associated with 3D printing and located within the first baffle structure.

17. The method of claim 15, wherein the first baffle structure further includes:

a second structural component, wherein the second structural component is one of a third baffle or the wall, and one or more second supports, extending from the first structural component to the second structural component, wherein the first structural component is the second baffle, and wherein the second baffle has a second cone and defines a second profile extending from a third diameter to a fourth diameter, the fourth diameter being smaller than the third diameter.

18. The method of claim 15, wherein the first model includes the first data for forming, by 3D printing, a second baffle structure in addition to the first baffle structure, and wherein the method further comprises forming, by the 3D printing system and based on the first data, the second baffle structure, wherein the second baffle structure includes at least one additional baffle, and wherein the second baffle structure extends from the first baffle structure such that the first baffle structure and the second baffle structure form a baffle stack, the baffle stack being a unitary body.

19. The method of claim 15, further comprising:

providing a second model to the 3D printing system, wherein the second model includes second data for forming, by 3D printing, a second baffle structure;

forming, by the 3D printing system and based on the second data, the second baffle structure, wherein the second baffle structure includes at least one additional baffle; and forming, by mating the first baffle structure and the second baffle structure, a baffle stack.

20. The method of claim 15, further comprising:

providing an engagement configured to mate with a barrel of a firearm; and mating the first baffle structure to the engagement.

* * * * *